US009942237B2

United States Patent
Belchee et al.

(10) Patent No.: US 9,942,237 B2
(45) Date of Patent: Apr. 10, 2018

(54) DETERMINING ACCESS REQUIREMENTS FOR ONLINE ACCOUNTS BASED ON CHARACTERISTICS OF USER DEVICES

(71) Applicant: Bank of America Corporation, Charlotte, NC (US)

(72) Inventors: William B. Belchee, Charlotte, NC (US); Elizabeth S. Votaw, Potomac, MD (US)

(73) Assignee: Bank of America Corporation, Charlotte, NC (US)

( * ) Notice: Subject to any disclaimer, the term of this patent is extended or adjusted under 35 U.S.C. 154(b) by 47 days.

(21) Appl. No.: 14/839,165

(22) Filed: Aug. 28, 2015

(65) Prior Publication Data
US 2017/0063865 A1    Mar. 2, 2017

(51) Int. Cl.
G06F 7/04      (2006.01)
H04L 29/06     (2006.01)
G06F 21/57     (2013.01)

(52) U.S. Cl.
CPC .......... *H04L 63/102* (2013.01); *G06F 21/577* (2013.01)

(58) Field of Classification Search
CPC ............................ H04L 63/102; G06F 3/0481
See application file for complete search history.

(56) References Cited

U.S. PATENT DOCUMENTS

| | | | |
|---|---|---|---|
| 7,155,739 B2 | 12/2006 | Bari et al. | |
| 7,546,452 B2 | 6/2009 | Aissi et al. | |
| 7,581,111 B2 | 8/2009 | Wagner et al. | |
| 7,865,726 B2 * | 1/2011 | Corley | G06F 21/53 709/201 |
| 7,953,976 B2 | 5/2011 | Giles et al. | |
| 8,117,452 B2 | 2/2012 | Bell et al. | |
| 8,214,642 B2 | 7/2012 | Baentsch et al. | |
| 8,219,814 B2 | 7/2012 | Elbury et al. | |
| 8,406,480 B2 | 3/2013 | Grigsby et al. | |
| 8,418,237 B2 | 4/2013 | Barbour et al. | |
| 8,438,382 B2 | 5/2013 | Ferg et al. | |
| 8,572,699 B2 | 10/2013 | Anand et al. | |
| 8,619,978 B2 | 12/2013 | Harik et al. | |
| 8,689,287 B2 | 4/2014 | Bohmer et al. | |
| 8,904,509 B2 | 12/2014 | Barbour et al. | |
| 9,027,099 B1 | 5/2015 | Saylor et al. | |
| 9,219,720 B1 * | 12/2015 | Satpathy | H04L 63/08 |
| 9,319,221 B1 * | 4/2016 | Awad | H04L 9/3231 |
| 2004/0044655 A1 * | 3/2004 | Cotner | G06F 21/6227 |
| 2008/0109873 A1 * | 5/2008 | Kulkarni | G06F 21/31 726/2 |
| 2010/0114776 A1 * | 5/2010 | Weller | G06F 21/31 705/44 |
| 2011/0191592 A1 * | 8/2011 | Goertzen | G06F 21/36 713/182 |

(Continued)

*Primary Examiner* — Khoi Le
(74) *Attorney, Agent, or Firm* — Michael A. Springs

(57) ABSTRACT

According to one embodiment, a system comprises a memory comprising instructions, an interface, and a processor communicatively coupled to the memory and the interface. The processor is configured, when executing the instructions, to determine one or more characteristics of a user device, determine, based on the one or more characteristics of the user device, a risk level associated with the user device, and apply, to the user device, one or more access restrictions for an online account based on the determined risk level.

17 Claims, 3 Drawing Sheets

(56) References Cited

U.S. PATENT DOCUMENTS

2011/0258689 A1* 10/2011 Cohen .................. H04L 63/061
 726/7
2014/0189835 A1* 7/2014 Umerley ................ G06F 21/40
 726/7

* cited by examiner

US 9,942,237 B2

DETERMINING ACCESS REQUIREMENTS FOR ONLINE ACCOUNTS BASED ON CHARACTERISTICS OF USER DEVICES

TECHNICAL FIELD

This disclosure relates generally to online account security, and more particularly to determining access requirements for online accounts based on characteristics of user devices.

BACKGROUND

Online accounts may typically be accessed using any suitable type of user device with network connectivity. However, user devices have varying levels of security protections in place. For example, some user devices may have software that is out of date or vulnerable to hacking. As another example, some user devices may not support encryption protocols. Thus, it is possible that online accounts may be accessed by user devices that are not secure, which may make information associated with the online account vulnerable to misappropriation.

SUMMARY OF THE DISCLOSURE

In accordance with the present disclosure, disadvantages and problems associated with accessing online accounts using devices having varying security features may be reduced or eliminated.

According to one embodiment, a system is provided that comprises a memory comprising instructions, an interface, and a processor communicatively coupled to the memory and the interface. The processor is configured, when executing the instructions, to determine one or more characteristics of a user device, determine, based on the one or more characteristics of the user device, a risk level associated with the user device, and apply, to the user device, one or more access restrictions for an online account based on the determined risk level.

According to one embodiment, a method is provided that comprises the steps of determining one or more characteristics of a user device, determining, based on the one or more characteristics of the user device, a risk level associated with the user device, and applying, to the user device, one or more access restrictions for an online account based on the determined risk level.

According to one embodiment, a computer-readable medium comprising instructions is provided. The instructions are configured when executed to determine one or more characteristics of a user device, determine, based on the one or more characteristics of the user device, a risk level associated with the user device, and apply to the user device, one or more access restrictions for an online account based on the determined risk level.

Technical advantages of certain embodiments of the present disclosure include applying access restrictions to a user device based on the device's hardware or software characteristics, which may prevent vulnerability in less secure user devices. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

The present disclosure describes systems and methods for determining access requirements for online accounts based on hardware or software characteristics of user devices. For example, a user device may have a mobile application installed thereon that allows a user to access an online account hosted on a server. In particular embodiments, the user device (e.g., via the mobile application) may determine one or more hardware or software characteristics of the user device. This may include characteristics such as whether the user device supports encryption, whether the user device is running a current software version, whether the user device is password protected, or whether the user device has other security features enabled (e.g., remote wiping features). Based on the characteristics of the device, a risk level associated with the user device may be determined. The user device may provide a notification indicating the determined risk level, such as with a tiered indication (e.g., high/medium/low, wherein high refers to a highly secure device, medium refers to a moderately secure device, and low refers to an unsecure device) or color-coded indication (e.g., green/yellow/red, wherein green refers to a highly secure device, yellow refers to a moderately secure device, and red refers to an unsecure device).

Based on the determined risk level, one or more access restrictions for an online account may be applied. For example, the mobile application may require certain levels of credentials (e.g., no credentials, a personal identification number (PIN) chosen by the user, a username and password combination, a biometric, or any combination thereof), to be entered to access the online account. While a highly secure device may require little to no credentials, for instance, an unsecure device may require a biometric (e.g., a fingerprint scan) in addition to a PIN number. In addition, the mobile application on the user device may limit the types of information or functions that may be accessed on the user device due to the determined risk level. The user device may indicate the access restrictions applied, and may then prompt the user to enter the credentials as required by the access restrictions. The user device may also prompt a user as to whether they wish to block access to additional information or functions based on the user device's risk level.

To facilitate a better understanding of the present disclosure, the following examples of certain embodiments are given. In no way should the following examples be read to limit, or define, the scope of the disclosure. Embodiments of the present disclosure and its advantages may be best understood by referring to FIGS. 1-4, where like numbers are used to indicate like and corresponding parts.

Figure 1:
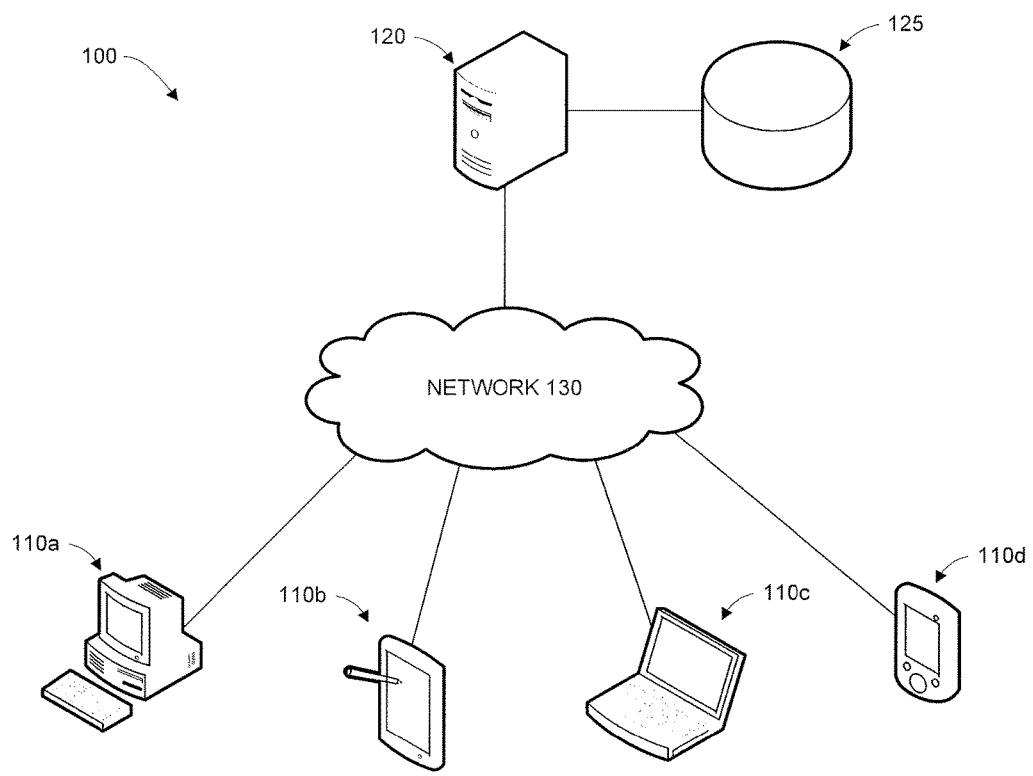
FIG. 1 illustrates an example system comprising user devices accessing a server over a network.

FIG. 1 illustrates an example system 100 comprising user devices 110 accessing server 120 over network 130. User devices 110 may include any suitable computing device that may be used to access one or more functions of server 120 through network 130. User devices 110 may include mobile computing devices with wireless network connection capabilities (e.g., wireless-fidelity (WI-FI), and/or BLUETOOTH capabilities). For example, user devices 120 may include laptop computers, smartphones, or tablet computers (such as tablet 110b, laptop 110c, and smartphone 110). User devices 110 may also include non-mobile devices such as desktop computers (such as desktop 110a). In certain embodiments, a number of different user devices 110 may be associated with a particular user. For example, a particular user may own each of desktop computer 110a, tablet 110b, laptop 110c, and smartphone 110d, and may use such devices to access the one or more functions of server 120 as described herein.

Server 120 may provide one or more functions accessible to user devices 110, as described herein. For example, server 120 may provide users of user devices 110 access to online banking functions through a website, through a dedicated application installed on the user device 110, or through any other suitable means. In providing functionality to user devices 110, server 120 may access or otherwise utilize database 125.

Network 130 may include any suitable technique for communicably coupling user devices 110 with server 120. For example, network 130 may include an ad-hoc network, an intranet, an extranet, a virtual private network (VPN), a wired or wireless local area network (LAN), wide area network (WAN), metropolitan area network (MAN), a portion of the Internet, a portion of the Public Switched Telephone Network (PSTN), a portion of a cellular telephone network, or any combination thereof.

Modifications, additions, or omissions may be made to FIG. 1 without departing from the scope of the present disclosure. For example, FIG. 1 illustrates particular types of user devices 110. However, it will be understood that any suitable type of user device 110 may be used to access the one or more functions provided by server 120. As another example, although illustrated as a single server, server 120 may include a plurality of servers in certain embodiments. Similarly, although illustrated as a single database, database 125 may include a plurality of databases in some embodiments.

Figure 2:
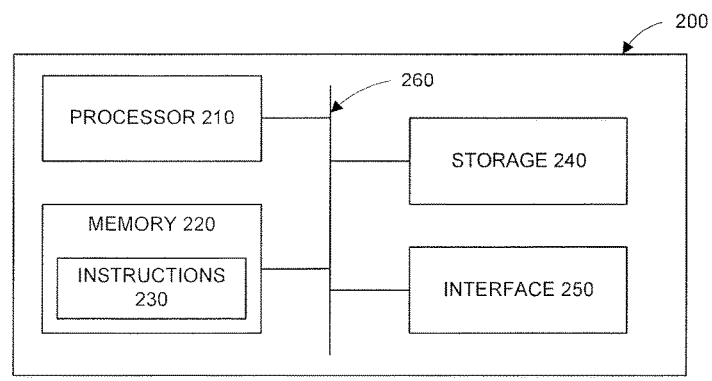
FIG. 2 illustrates an example computer system in accordance with embodiments of the present disclosure.

FIG. 2 illustrates an example computer system 200 in accordance with embodiments of the present disclosure. One or more aspects of computer system 200 may be used in user devices 110 or server 120 of FIG. 1. For example, each of user devices 110 or server 120 may include a computer system 200 in some embodiments. As another example, each of user devices 110 or server 120 may include two or more computer systems 200 in some embodiments.

Computer system 200 may include a processor 210, memory 220 comprising instructions 230, storage 240, interface 250, and bus 260. These components may work together to perform one or more steps of one or more methods (e.g. method 500 of FIG. 5) and provide the functionality described herein. For example, in particular embodiments, instructions 230 in memory 220 may be executed on processor 210 in order to process requests received by interface 250 using common function modules. In certain embodiments, instructions 230 may reside in storage 240 instead of, or in addition to, memory 220.

Processor 210 may be a microprocessor, controller, application specific integrated circuit (ASIC), or any other suitable device or logic operable to provide, either alone or in conjunction with other components (e.g., memory 220 and instructions 230) functionality according to the present disclosure. Such functionality may include processing application functions using remotely-located common function modules, as discussed herein. In particular embodiments, processor 210 may include hardware for executing instructions 230, such as those making up a computer program or application. As an example and not by way of limitation, to execute instructions 230, processor 210 may retrieve (or fetch) instructions 230 from an internal register, an internal cache, memory 220, or storage 240; decode and execute them; and then write one or more results of the execution to an internal register, an internal cache, memory 220, or storage 240.

Memory 220 may be any form of volatile or non-volatile memory including, without limitation, magnetic media, optical media, random access memory (RAM), read-only memory (ROM), flash memory, removable media, or any other suitable local or remote memory component or components. Memory 220 may store any suitable data or information utilized by computer system 200, including software (e.g., instructions 230) embedded in a computer readable medium, and/or encoded logic incorporated in hardware or otherwise stored (e.g., firmware). In particular embodiments, memory 220 may include main memory for storing instructions 230 for processor 210 to execute or data for processor 210 to operate on. In particular embodiments, one or more memory management units (MMUs) may reside between processor 210 and memory 220 and facilitate accesses to memory 220 requested by processor 210.

Storage 240 may include mass storage for data or instructions (e.g., instructions 230). As an example and not by way of limitation, storage 240 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium. Storage 240 may include removable or non-removable (or fixed) media, where appropriate. Storage 240 may be internal or external to computer system 200, where appropriate. In some embodiments, instructions 230 may be encoded in storage 240 in addition to, in lieu of, memory 220.

Interface 250 may include hardware, encoded software, or both providing one or more interfaces for communication (such as, for example, packet-based communication) between computer systems on a network (e.g., between employee devices 110 and back-end 130 of FIG. 1). As an example, and not by way of limitation, interface 250 may include a network interface controller (NIC) or network adapter for communicating with an Ethernet or other wire-based network and/or a wireless NIC (WNIC) or wireless adapter for communicating with a wireless network. Interface 250 may include one or more connectors for communicating traffic (e.g., IP packets) via a bridge card. Depending on the embodiment, interface 250 may be any type of interface suitable for any type of network in which computer system 200 is used. In some embodiments, interface 250 may include one or more interfaces for one or more I/O devices. One or more of these I/O devices may enable communication between a person and computer system 200. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these.

Bus 260 may include any combination of hardware, software embedded in a computer readable medium, and/or encoded logic incorporated in hardware or otherwise stored (e.g., firmware) to communicably couple components of computer system 200 to each other. As an example and not by way of limitation, bus 260 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 260 may include any number, type, and/or configuration of buses 260, where appropriate. In particular embodiments, one or more buses 260 (which may each include an address bus and a data bus) may couple processor 210 to memory 220. Bus 260 may include one or more memory buses.

Modifications, additions, or omissions may be made to FIG. 2 without departing from the scope of the present disclosure. For example, FIG. 2 illustrates components of computer system 200 in a particular configuration. However, any configuration of processor 210, memory 220, instructions 230, storage 240, interface 250, and bus 260 may be used, including the use of multiple processors 210 and/or buses 260. In addition, computer system 200 may be physical or virtual.

Figures 3A, 3B, 3C:
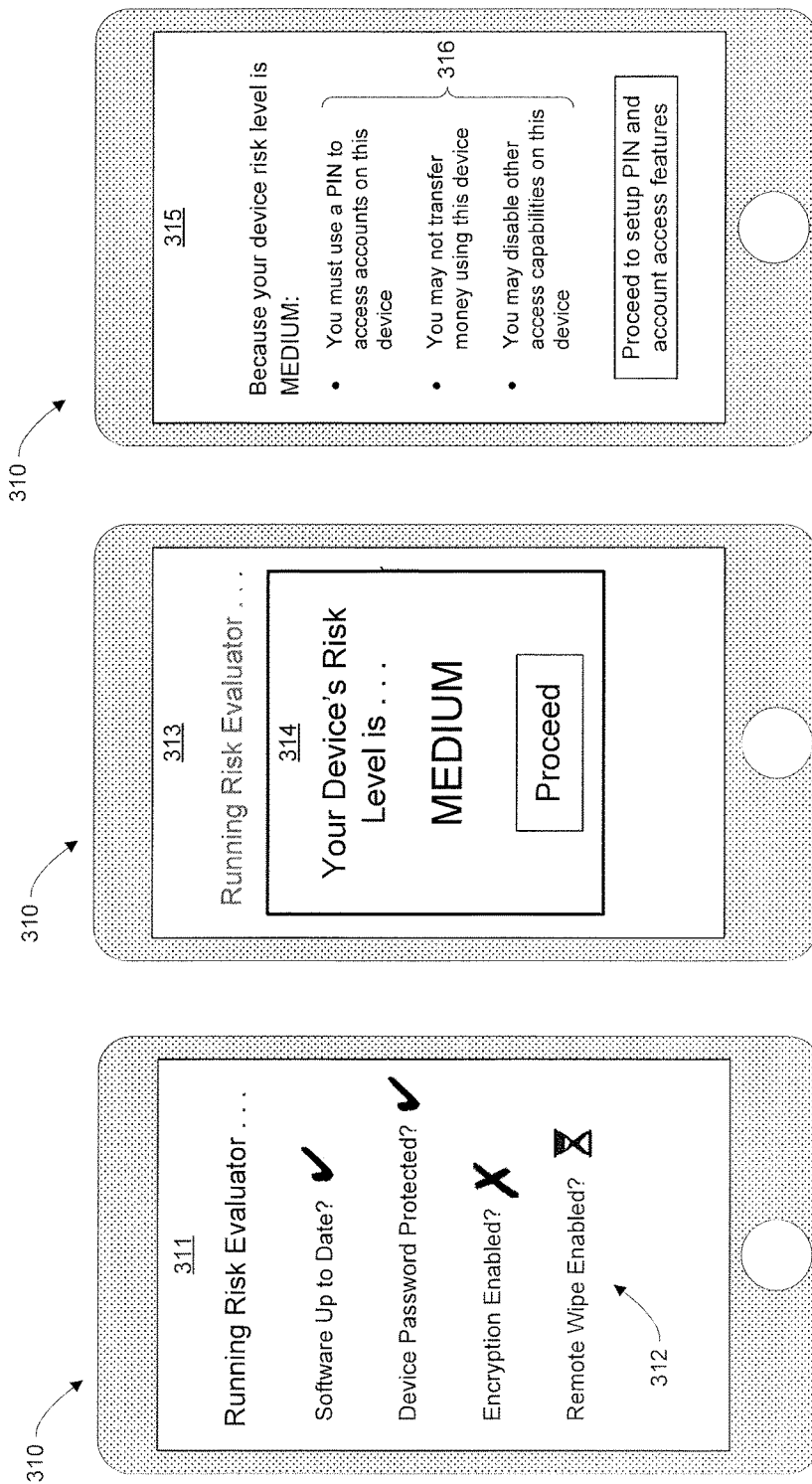
FIGS. 3A-3C illustrate an example user device determining access requirements for an online account based on hardware or software characteristics of the user device in accordance with embodiments of the present disclosure.

FIGS. 3A-3C illustrate an example user device 310 determining access requirements for an online account based on hardware characteristics of the user device 310 in accordance with embodiments of the present disclosure. User device 310 may have a mobile application installed thereon that allows a user to access an online account hosted on a server via a user interface on the user device 310. As shown in FIG. 3A, in particular embodiments, user device 310 (e.g., using the mobile application) may determine one or more hardware or software characteristics of the user device 310 and may provide notifications 312 in user interface 311 indicating the characteristics being determined. Notifications 312 may be shown before, during, or after the indicated characteristics are determined. For example, as shown in FIG. 3A, user device 310 may determine and provide associated indications of characteristics such as whether user device 310 supports encryption, whether user device 310 is running a current software version, whether user device 310 is password protected, or whether user device 310 has other security features enabled (e.g., remote wiping features).

Based on the determined characteristics of the device, a risk level associated with the user device may be determined and an associated indication may be made, as shown in notification 314 of user interface 313 of FIG. 3B. The user device may provide a notification indicating the determined risk level, such as with a tiered indication (e.g., high/medium/low, wherein high refers to a highly secure device, medium refers to a moderately secure device, and low refers to an unsecure device) or color-coded indication (e.g., green/yellow/red, wherein green refers to a highly secure device, yellow refers to a moderately secure device, and red refers to an unsecure device).

Based on the determined risk level, one or more access restrictions for an online account may be applied and an associated indication may be provided, as shown in notifications 316 of user interface 315 of FIG. 3C. For example, the mobile application on user device 310 may require certain levels of credentials (e.g., no credentials, a personal identification number (PIN) chosen by the user, a username and password combination, a biometric, or any combination thereof), to be entered to access the online account. In addition, the mobile application on user device 310 may limit types of information or functions may or may not be accessed on the user device due to the determined risk level. The user device may indicate the access restrictions applied (e.g., using notifications such as notifications 316), and may then prompt the user to enter the credentials as required by the access restrictions (not shown). The user device may also prompt a user as to whether they wish to block access to additional information or functions based on the user device's risk level.

Modifications, additions, or omissions may be made to FIGS. 3A-3C without departing from the scope of the present disclosure. For example, FIGS. 3A-3C illustrate a particular type of user device 310 determining access requirements for an online account based on its hardware or software characteristics. However, it will be understood that any suitable type of user device 310 may be used to determine access requirements for an online account based on its hardware or software characteristics. Although user interface 311 indicates particular hardware and software characteristics being determined, it will be understood that any suitable hardware or software characteristics useful for determining a user device's risk level may be used. In addition, although particular types of notifications 312, 314, and 316 are shown in user interfaces 311, 313, and 315, respectively, it will be understood that any suitable types of notifications may be used. Furthermore, although shown as using a tiered indication (e.g., high/medium/low) for notification 314, it will be understood that any suitable indication of the device's risk level may be used, such as a color-coded indication.

Figure 4:
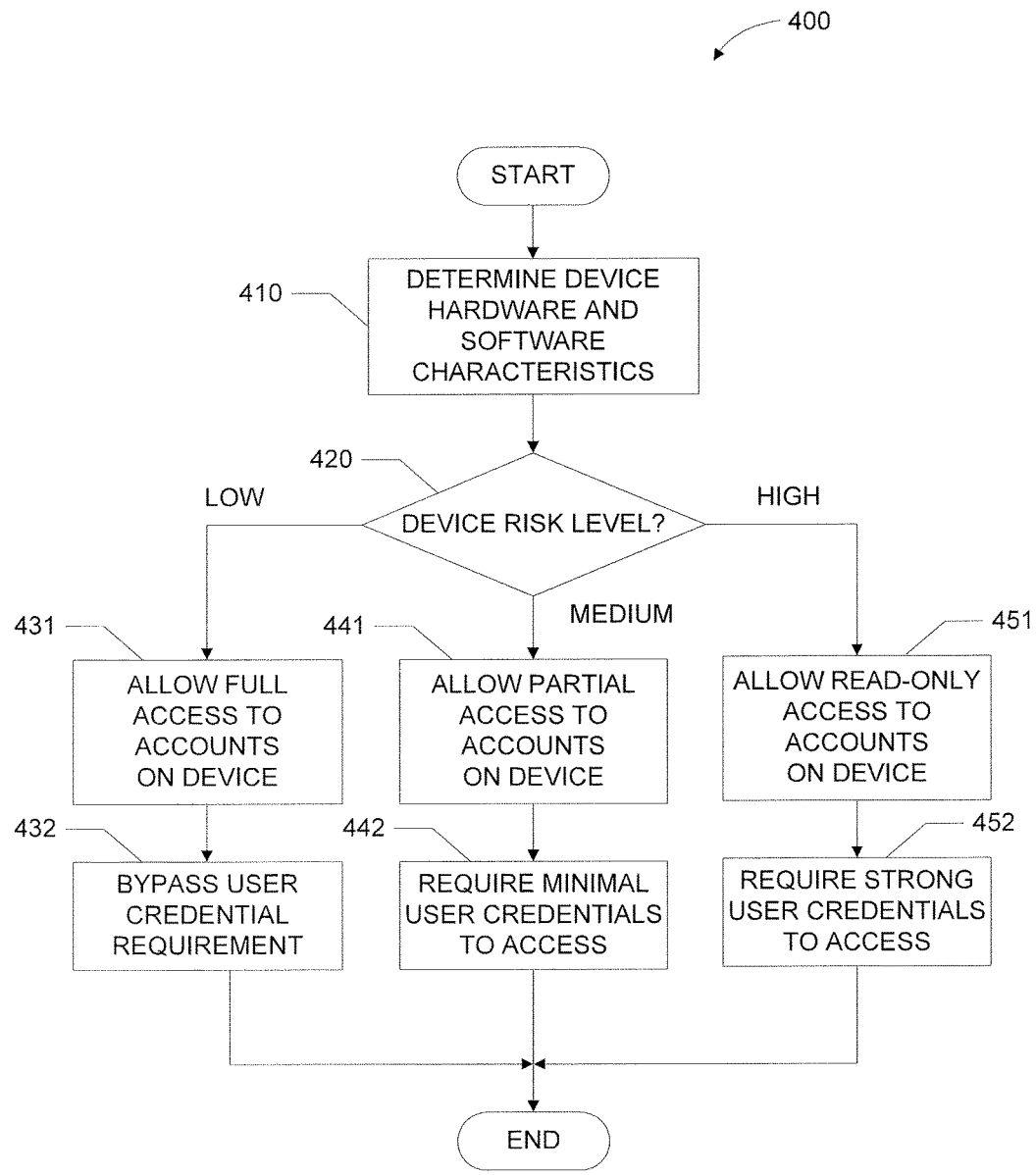
FIG. 4 illustrates an example method for determining access requirements for an online account based on hardware or software characteristics of a user device in accordance with embodiments of the present disclosure.

FIG. 4 illustrates an example method 400 for determining access requirements for an online account based on hardware characteristics of a user device in accordance with embodiments of the present disclosure. The method begins at step 410, where the user device's hardware and software characteristics are determined. This may include characteristics such as whether the user device supports encryption, whether the user device is running a current software version, whether the user device is password protected, or whether the user device has other security features enabled (e.g., remote wiping features).

At step 420, a risk level associated with the user device may be determined. The risk level may be based on the device characteristics determined in step 410. In certain embodiments, this may include providing a notification indicating the determined risk level, such as with a tiered indication (e.g., high/medium/low, wherein high refers to a highly secure device, medium refers to a moderately secure device, and low refers to an unsecure device) or color-coded indication (e.g., green/yellow/red, wherein green refers to a highly secure device, yellow refers to a moderately secure device, and red refers to an unsecure device).

Based on the determined risk level of the user device, the method proceeds to either step 431, 441, or 451. If the user device is determined to be highly secure (i.e., a low risk level), then little to no access restrictions are applied, and the method proceeds to step 431, where full access to information and functions of the online account is granted. In addition, at step 432, the requirement for entering credentials is bypassed since the user device is highly secure. If, however, the user device is determined to be moderately secure (i.e., a medium risk level), then a moderate amount of access restrictions are applied, and the method proceeds to step 441, where partial access to information and functions of the online account is granted (i.e., some types of information or functions are not allowed to be access on the user device). At step 442, minimal user credentials (e.g., only a PIN) are required for the user device to access the online account. If the user device is determined to be relatively unsecure (i.e., a high risk level), then strong access restrictions are applied, and the method proceeds to step 451, where read-only access is granted to certain information in the online account and access to functions of the online account is denied. At step 452, strong credentials (e.g., one or more of a username/password combination, a PIN, and a biometric) are required in order to access the online account on the user device.

Modifications, additions, or omissions may be made to method 400 without departing from the scope of the present disclosure. For example, the order of the steps may be performed in a different manner than that described and some steps may be performed at the same time. Additionally, each individual step may include additional steps without departing from the scope of the present disclosure. Furthermore, although three risk levels are depicted with certain access restrictions associated therewith, any suitable number of risk levels may be used, with each having suitable access restrictions associated therewith.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. A system comprising:
a memory comprising instructions;
an interface;
a processor communicatively coupled to the memory and the interface, the processor configured, when executing the instructions, to:
  determine one or more device characteristics of a user device, wherein the one or more device characteristics of the user device comprise:
    enabled security features of the user device;
    hardware characteristics of the user device, and software characteristics of the user device;
  determine, based on the one or more device characteristics of the user device, a security level associated with the user device;
  determine credential requirements for accessing an online account based on the security level associated with the user device;
  allow access to the online account in response to satisfying the determined credential requirements;
  grant full access to information and functions of the online account and bypass user credential requirement when the determined security level associated with the user device is high;
  apply partial access to information and functions of the online account and require minimal user credentials when the determined security level associated with the user device is medium; and
  allow read-only access to information and functions of the online account and require strong user credentials when the determined security level associated with the user device is low.

2. The system of claim 1, wherein the determined credential requirements require at least one of: a username and password combination, a personal identification number, and a biometric.

3. The system of claim 1, wherein the device characteristics include whether the user device supports encryption.

4. The system of claim 1, wherein the interface is configured to provide a notification indicating:
the determined risk level, and
the determined credential requirements for accessing the online account.

5. The system of claim 1, wherein the device characteristics include whether the user device is running a current software version.

6. The system of claim 1, wherein the device characteristics include whether the user device is password protected.

7. A method, comprising:
determining, by a processor, one or more device characteristics of a user device, wherein the one or more device characteristics of the user device comprise:
  enabled security features of the user device;
  hardware characteristics of the user device, and
  software characteristics of the user device;
determining, by the processor, based on the one or more device characteristics of the user device, a security level associated with the user device;
determining, by the processor, credential requirements for accessing an online account based on the security level associated with the user device;
allowing, by the processor, access to the online account in response to satisfying the determined credential requirements;
granting full access to information and functions of the online account and bypassing user credential requirement when the determined security level associated with the user device is high;
applying partial access to information and functions of the online account and requiring minimal user credentials when the determined security level associated with the user device is medium; and
allowing read-only access to information and functions of the online account and requiring strong user credentials when the determined security level associated with the user device is low.

8. The method of claim 7, wherein the determined credential requirements require at least one of: a username and password combination, a personal identification number, and a biometric.

9. The method of claim 7, wherein the device characteristics include whether the user device supports encryption.

10. The method of claim 7, further comprising providing a notification indicating:
the determined risk level, and
the determined credential requirements for accessing the online account.

11. The method of claim 7, wherein the device characteristics include whether the user device is running a current software version.

12. The method of claim 7, wherein the device characteristics include whether the user device is password protected.

13. A computer-readable medium comprising instructions that are configured, when executed by a processor, to:
determine one or more device characteristics of a user device, wherein the one or more device characteristics of the user device comprises:
  enabled security features of the user devices;
  hardware characteristics of the user device, and
  software characteristics of the user device;

determine, based on the one or more device characteristics of the user device, a security level associated with the user device;

determine credential requirements for accessing an online account based on the security level associated with the user device;

allow access to the online account in response to satisfying the determine credential requirements;

grant full access to information and functions of the online account and bypass user credential requirement when the determined security level associated with the user device is high;

apply partial access to information and functions of the online account and require minimal user credentials when the determined security level associated with the user device is medium; and allow read-only access to information and functions of the online account and require strong user credentials when the determined security level associated with the user device is low.

14. The computer-readable medium of claim 13, wherein the determined credential requirements require at least one of: a username and password combination, a personal identification number, and a biometric.

15. The computer-readable medium of claim 13, wherein the device characteristics include whether the user device supports encryption.

16. The computer-readable medium of claim 13, wherein the device characteristics include whether the user device is running a current software version.

17. The computer-readable medium of claim 13, further comprising providing a notification indicating the determined credential requirements for accessing the online account.

* * * * *